April 23, 1968 J. H. BENNETT 3,379,839

MAGNETIC RECORDING DYNAMIC RANGE COMPRESSOR/EXPANDER SYSTEM

Filed Dec. 7, 1964 2 Sheets-Sheet 1

INVENTOR
JOHN HUGHES BENNETT
BY
Christie, Parker & Hale
ATTORNEYS.

MAGNETIC RECORDING DYNAMIC RANGE COMPRESSOR/EXPANDER SYSTEM

Filed Dec. 7, 1964 2 Sheets-Sheet 2

INVENTOR.
JOHN HUGHES BENNETT
BY
Christie, Parker & Hale
ATTORNEYS.

United States Patent Office 3,379,839

Patented Apr. 23, 1968

3,379,839

MAGNETIC RECORDING DYNAMIC RANGE COMPRESSOR/EXPANDER SYSTEM

John Hughes Bennett, Granada Hills, Calif., assignor to Consolidated Electrodynamics Corporation, Pasadena, Calif., a corporation of California Filed Dec. 7, 1964, Ser. No. 416,315
1 Claim. (Cl. 179—100.2)

ABSTRACT OF THE DISCLOSURE

There is described a magnetic tape recorder in which the amplitude of the signal being recorded is compressed to reduce its dynamic range. A high frequency carrier is simultaneously recorded on the same channel of tape. It is modulated in frequency according to variations in the amount of amplitude compression. This carrier is above the normal recording frequency range of the recorder so that it does not affect the normal recording band width of the recorder. On playback, the carrier is demodulated and the gain of the playback amplifier is expanded by an amount controlled by the demodulated signal.

This invention relates to magnetic recording and, more particularly, is concerned with recording and reproducing analog signals having a large dynamic range of amplitude.

Magnetic tape recorders capable of recording broadband analog signals typically operate at a signal-to-noise ratio of less than 30 db. Any attempt to increase this signal-to-noise ratio by increasing the record current above the normal record level, results in distortion or severe reduction in remanence of all signals. Peak amplitudes of the input signal that exceed the normal record level must be attenuated prior to recording and so the full dynamic range of the signal source is lost in the transcription.

The present invention is directed to an arrangement in which the effective dynamic range of a magnetic tape recording system can be increased so that signals varying in amplitude over as high as a 60 or 70 db range can be faithfully reproduced to provide the same range of amplitude on playback. While "compression" of the amplitude variations of the input signal permits recording of all signals at a level which will result in lower distortion, on playback the amplitude information has been lost. Thus the dynamic range of the output signal is reduced to that of the recording system. The present invention provides a means by which the amplitude of the recorded signal can be compressed during recording and expanded again during playback so as to restore the dynamic range of the original signal. By the present invention, input signals having a peak amplitude of 60 to 70 db and even higher above noise level can be recorded and reproduced on a single track of magnetic tape.

In brief, the recording and reproducing apparatus of the present invention comprises a variable attenuator means for controlling the amplitude of the input signal prior to recording so that the peak amplitude is reduced to a level which can be effectively recorded by a conventional tape recorder. Means is provided for generating a control signal indicative of the variations of the attenuator means in reducing the peak amplitude of the input signal. The control signal is used to frequency modulate a carrier signal having a frequency substantially higher than the maximum frequency of the input signal. The frequency modulated carrier is combined with the attenuated input signal and recorded on a single track of magnetic tape. During playback, the combined signals are reproduced and separated by filter means. A frequency demodulator reproduces the control signal, the control signal then being applied to a variable gain circuit coupled to the output of the filter. The variable gain circuit in response to the control signal controls the gain so as to expand the peak amplitude of the information signal, thus restoring the information signal to its initial dynamic range of amplitude.

For a more complete understanding of the invention, reference should be made to the accompanying drawings wherein:

FIGURE 3 is a response curve useful in explaining the present invention.

Figures 1, 2:
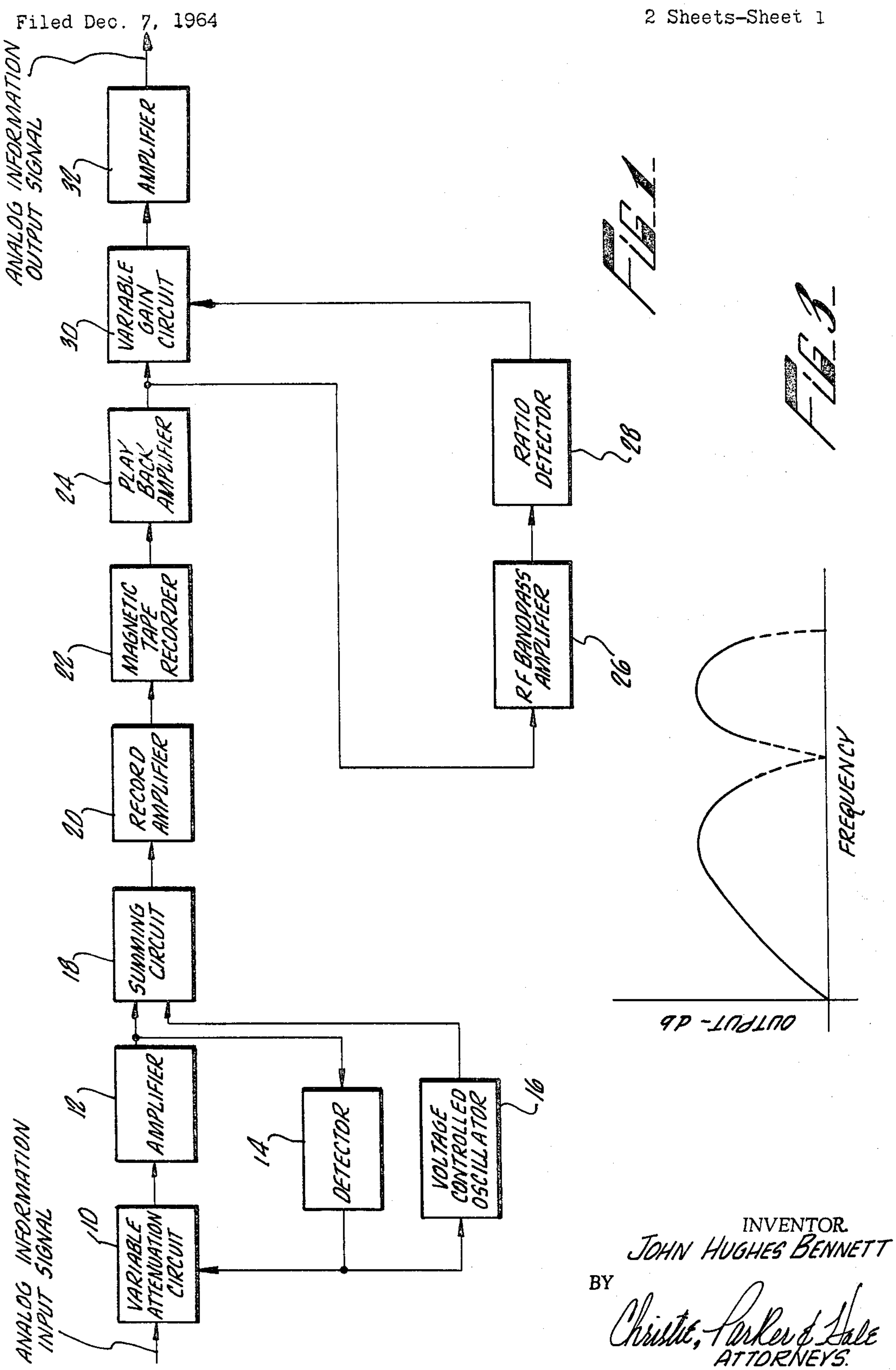
FIGURE 1 is a block schematic diagram of the invention.
FIGURE 2 is a schematic circuit diagram of a suitable variable gain circuit.
Figure 2:
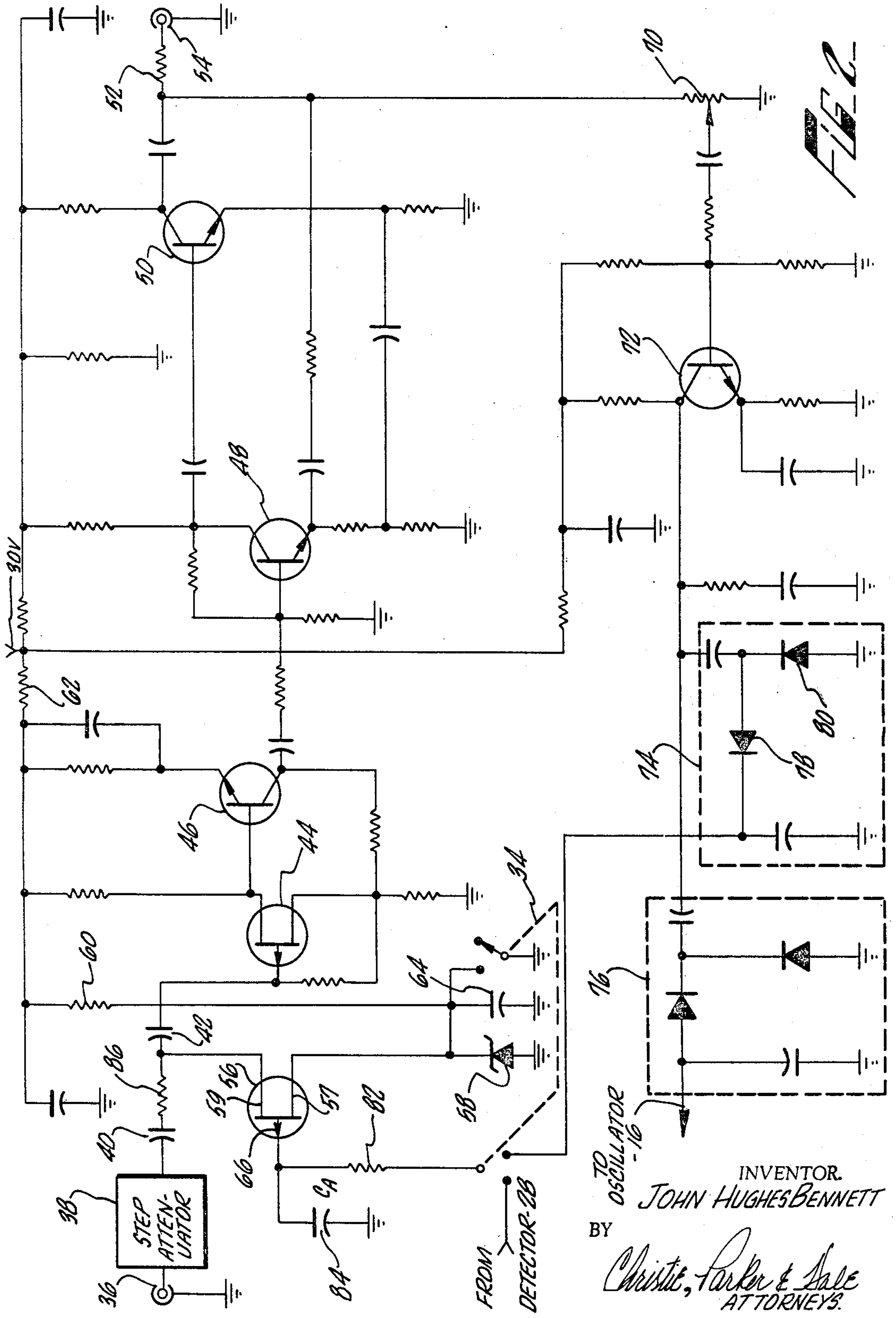

Referring to FIGURE 1, an analog information signal which is to be recorded is applied to a variable attenuator circuit 10. This circuit will be hereinafter described in detail in connection with FIGURE 2. Functionally, however, the variable attenuator circuit 10 provides a variable shunt resistance element to reduce the amplitude of the input signal in response to changes in the level of an applied DC input. The attenuated output from the variable attenuation circuit 10 is amplified by a suitable broad band amplifier 12 and a portion of the output signal from the amplifier 12 is applied to a detector 14. The detector 14 is in the form of a half wave rectifier circuit by which a DC component of the information signal is derived and applied to the control input of the variable attenuation circuit 10. The closed loop circuit provided by the variable attenuator circuit 10, amplifier 12 and detector 14 operates to maintain the peak amplitude of the information signal at the output of the amplifier 12 at a substantially constant level in spite of wide variations in the peak amplitude of the input signal.

The DC control signal from the output of the detector 14 is also applied to a voltage controlled oscillator 16 which operates as a frequency modulated carrier source. The center frequency of the oscillator 16 is substantially higher in frequency than the highest frequency of the analog information input signal.

The output of the voltage controlled oscillator 16 is applied together with the output of the amplifier 12 to a summing circuit 18, for summing the two signals. The output of the summing circuit 18 is amplified by suitable record amplifier 20 and is applied to a magnetic tape recorder unit 22 for recording on magnetic tape.

One of the significant aspects of the present invention is that the control signal for compressing the amplitude of the input signal is transmitted and recorded along with the information signal on the same channel on the magnetic tape so that it is available on playback to reconstruct and reproduce the full dynamic range of amplitude variations of the input signal. This is accomplished by utilizing a phenomenon peculiar to magnetic tape recorders. Shown in FIGURE 3 is a typical response curve of the output of an unequalized reproduced head of a magnetic recorder. As the frequency of the recorded signal increases, the amplitude of the output signal increases at a linear rate of 6 db per octave. At the higher frequencies, the amplitude begins to drop off and at a frequency where the wavelength becomes substantially equal to the gap width of the magnetic head, the amplitude drops off to zero. However, if the frequency is increased to where the wavelength becomes shorter than the gap width, a pronounced output can be observed. This phenomenon is described in detail in the book "Magnetic Recording Techniques" by W. Earl Stewart, published in 1958 by McGraw-Hill Publishing Company, page 69.

The center frequency of the voltage controlled oscillator 16 is selected to correspond to the peak of this secondary output condition. By this technique, the control signal can be recorded without distorting or interfering with the recording of the information signal.

During playback, the recorded signal is reproduced by a playback amplifier 24. The FM carrier is stripped off by an RF band pass amplifier 26 and applied to a ratio detector 28 to recover the control signal. The control signal from the output of the ratio detector 28 is applied to a variable gain circuit 30, which will also hereinafter be described in detail in connecton with FIGURE 2. In response to the applied control signal, the variable gain circuit 30 expands the amplitude of the information signal derived from the output of the playback amplifier 24. The expanded signal is then amplified by a suitable output amplifier 32. The amplifier 32 includes a low pass filter so that only the information signal frequencies are amplified and delivered to the output terminal.

Referring to FIGURE 2, a schematic showing of a circuit which may be used as either the variable attenuation circuit 10 or the variable gain circuit 20 is shown. For convenience of illustration, the circuit function is shown as being changed from one to the other by means of a double-pole double-throw switch indicated generally at 34. The switch is shown in the position C in which it functions as the variable attenuation circuit 10. With the switch thrown to the position E, the circuit functions as the variable gain circuit 30.

With the switch in the position shown to provide operation as a variable attenuation circuit, the input signal is applied across an input jack 36 and connected across a step attenuator 38 for attenuating the input signal to a selected average operating level. The output of the step attenuator 38 is coupled through a pair of series capacitors 40 and 42 to the input of a two stage direct coupled amplifier including a unipolar field effect transistor 44 and a junction transistor 46. The output of the transistor 46 is AC coupled to a second amplifier including a pair of transistors 48 and 50. The second pair of transistors are connected in a conventional feedback amplifier configuration to provide linear broad band amplification. The output signal derived from the collector of the transistor 50 is coupled through an impedance build-out resistor 52 to an output jack 54.

The level of the output signal is controlled by a variable shunt resistance element in the form of a unipolar field effect transistor 56 connected between the output of the step attenuator and ground potential. When operating as a compressor or attentuation circuit, a Zener diode 58 is connected between the source electrode 57 of the unipolar transistor 56 and ground to provide a positive bias potential derived through a resistor 60 and resistor 62 from a 30 volt potential source. A large bypass capacitor 64 is connected across the diode 58 to provide a low impedance path for the AC signal to ground. Thus the voltage at the gate electrode 66 of the transistor 56 controls the effective shunt resistance to ground offered to the information signal. This control voltage is derived from the output of the amplifier stage 50 in the following manner.

A potentiometer 70 is used to derive a portion of the output signal. A single stage of amplification provided by a transistor 72 provides buffering to a voltage doubler indicated generally at 74, and a second voltage doubler circuit indicated generally at 76. The voltage doubler circuit 74 provides, by means of rectifiers 78 and 80, a DC control signal which is applied through a series resistor 82 to the gate electrode of the unipolar transistor 56. The polarity of the DC control signal is such that if the amplitude of the output signal derived across the potentiometer 70 increases, the level of the positive voltage derived across the output of the doubler circuit 74 increases in a positive direction providing an increase in the bias level on the gate electrode of the unipolar field effect transistor 56. This reduces the voltage between the gate and the source, and reduces the effective shunt resistance between the source and the drain electrode 59 of the field effect transistor 56.

The resistor 82 and a capacitor 84 form a delay circuit which determines the attack time of the compressor. This delay time should be of the order of one period at the lowest frequency normally encountered by the recording system.

It will be seen that the compressor circuit operates to hold the output amplitude at a substantially constant level by virtue of the negative feedback effect of the signal derived from the potentiometer 70 and applied to the control signal from the voltage doubler circuit 74 to the gate of the field effect transistor 56. The effective resistance between the drain and source electrodes of the field effect transistor 56 and a resistor 86 connected to the output of the step attenuator forms a voltage divider with one leg being variable in resistance. Whenever the signal amplitude increases, the resistance of the variable leg is decreased, increasing the attenuation of the output signal.

When used as an expander or variable gain circuit, the switch 34 is placed in the E position. In this position, as shown in FIGURE 2, the gate 66 of the field effect transistor 56 is connected through the resistor 82 to the output of the FM demodulator 28. Since the voltage doubler circuit 76 is of opposite polarity from that of the voltage doubler 74, the signal derived from the FM demodulator is of opposite polarity and therefore produces the reverse effect in controlling the field effect transistor 56. Thus if the input information signal increases in amplitude, the output from the voltage doubler 74 operates to decrease the effective resistance of the field effect transistor 56 in the compressor while the output of the voltage doubler 76, after modulation and demodulation, operates to increase the effective resistance of the field effect transistor 56 in the expander circuit.

From the above description, it will be seen that a recording system is provided by the present invention in which the information signal can be compressed in amplitude before recording and expanded again during playback to the original amplitude level. The amount of compression and expansion is controlled according to the amplitude of the input signal, so that signals of large amplitude are compressed and expanded relatively more than signals of small amplitude.

In this manner, input signals which vary over a large dynamic range of amplitude can be accommodated on magnetic tape without signals of small amplitude dropping below the noise level or signls of maximum amplitude exceeding the maximum record level of the tape recording system. Information as to the amount of compression is recorded on the same track together with the information signal so as to be available during playback for controlling the amount of expansion applied to the reproduced signal during playback. This is accomplished without reducing the band width of the recording system.

What is claimed is:

1. Apparatus for recording and reproducing an input signal having a large dynamic range, comprising variable attenuator means for reducing the amplitude of the input signal, means responsive to the amplitude of the output from the attenuator means for controlling the variable attenuator means to hold the amplitude of the output of the attenuator means more nearly constant, means for generating a control signal indicative of the variations of the attenuator means, means for generating a carrier signal having a frequency substantially higher than the maximum frequency of said input signal, means for modulating the carrier signal with the control signal, magnetic recording apparatus including a magnetic recording head having a gap, the gap being larger than one wave length of said carrier signal but smaller than the wavelengths of said input signal, means for adding the output of the attenuator means and the modulating means and applying the combined signals to the recording apparatus, means for reproducing the combined signals from the recording apparatus, filter means for separating said combined signals, means coupled to one output of the separating means for demodulating the reproduced modulated carrier to recover the control signal, variable gain means coupled to the other output of the separating means, and means responsive to the recovered control signal for controlling the variable gain means to vary the amplitude of the output of the variable gain means with changes in the control signal.

References Cited

UNITED STATES PATENTS

| | | | |
|---|---|---|---|
| 2,425,213 | 8/1947 | Sunstein | 179—100.2 |
| 3,041,415 | 6/1962 | Gratian | 179—100.2 |
| 3,206,556 | 9/1965 | Bachman et al. | 179—100.1 |
| 3,253,237 | 5/1966 | Runyan | 179—100.2 |

BERNARD KONICK, *Primary Examiner.*

A. I. NEUSTADT, *Assistant Examiner.*